United States Patent [19]

Thompson

[11] Patent Number: 5,592,260
[45] Date of Patent: Jan. 7, 1997

[54] PHOTOGRAPHIC CROPPING DEVICE AND METHOD

[76] Inventor: Brett R. Thompson, 2477 S. Lake St., Salt Lake City, Utah 84106

[21] Appl. No.: 516,796

[22] Filed: Aug. 18, 1995

[51] Int. Cl.⁶ ................................................ G03B 27/58
[52] U.S. Cl. .............................................. 355/74; 355/72
[58] Field of Search ........................................ 355/72, 74

[56] References Cited

U.S. PATENT DOCUMENTS

| 4,249,822 | 2/1981 | Breslau | 355/74 |
| 4,970,547 | 11/1990 | Desai | 355/61 |

OTHER PUBLICATIONS

Professional Photo Products, Inc. Speed Carrier Catalog, p. 1.
Saunders Easels Catalog.
Doran/Premier, p. 9.

*Primary Examiner*—Arthur T. Grimley
*Assistant Examiner*—Herbert V. Kerner
*Attorney, Agent, or Firm*— Mallinckrodt & Mallinckrodt

[57] ABSTRACT

A device for producing-cropped photographs is made up of separate pieces adapted to be assembled entirely by feel in a darkroom relative to a conventional enlarger for the making of prints from a photographic image projected by the enlarger. The device includes a base sheet and template sheet or sheets having the same shape and outside dimensions as the base sheet. Both the base sheet and the template sheet or sheets are sufficiently thick and stiff to enable proper alignment thereof entirely by feel in a darkroom of the outer peripheries thereof, relative to a sheet of photographic paper interposed therebetween. Multiple template sheets are preferably provided by packaging the device in kit form. In assembling the device in a darkroom, adjustment of the enlarger is usually carried out relative to the base sheet with the room lighted and prior to placement of the unexposed photographic paper, the base sheet being fastened in place on the enlarger stand as by pressure sensitive tape following adjustment of the enlarger. The invention is also concerned with the method of using the device.

17 Claims, 2 Drawing Sheets

PHOTOGRAPHIC CROPPING DEVICE AND METHOD

BACKGROUND OF THE INVENTION

1. Field

The invention is in the field of photography, and particularly the darkroom enlarging and printing of photographs.

2. State of the Art

Adjustable cropping devices, usually in the form of so-called "easels" are in general use. As used, the operator places a sheet of photographic paper on the bed of the device in a darkroom and moves adjustably-attached, side pieces over onto the paper to frame a desired opening for receiving the image to be applied to and developed on the paper. The side pieces are arranged to cover edge margins of the paper so as to prevent exposure of those areas. After the image to be printed is projected onto the paper by a conventional enlarger and the operator develops the exposed paper as a photographic print, the resulting image on the print is framed by a white border. Such cropping easels are shown in various brochures and catalogs. They are quite expensive. Moreover, operators have difficulty accurately placing the photographic paper on them in a darkroom. Also, they are delicate and easily damaged. The side members are typically made of thin metal, which are easily bent out of place as well as being subject to damage from developer chemicals used in darkrooms. Such easel cropping devices are intended for professional photographers. Amateurs and photographic students do not usually own an easel and those provided in schools are for use in common by many students and are subject to abuse.

SUMMARY OF THE INVENTION

A principle objective of this invention is to provide an inexpensive photographic cropping device that may be packaged and sold in kit form with several alternative sizes of templates, that is resistant to damage from breakage and darkroom developer chemicals, and by which an operator can easily load photographic paper in a darkroom by feel.

In accomplishing this objective, a feature of the invention is to provide the components of the device as separate pieces of stiff sheet formation having the same outside peripheral shape and dimensions so that a piece of photographic paper having substantially the same shape and outside dimensions can be placed on a base sheet formation, in a darkroom in proper position, as one piece of the device, and so that a template of sheet formation, as another piece of the device, can be placed in proper position on the base sheet, entirely by feel.

The template provided by the device, or selected from a set of multiple templates provided by the device as made up in kit form, has an interior opening positioned to receive and pass therethrough an image projected typically from an overhead enlarger onto the inserted sheet of photographic paper. The template protects edge margins of the photographic paper from being exposed, thereby providing a frame of unexposed photographic paper which is white and surrounds the image following development of the exposed photographic paper.

Both the base sheet and the templates are thick and stiff relative to the photographic paper to enable precise alignment of the photographic paper and the templates as superimposed on the base sheet entirely by feel in a darkroom.

The base sheet typically has its upper surface white to reflect an image projected from the enlarger to enable enlarger adjustment in the darkroom as lighted for the purpose and prior to insertion of the photographic paper. After adjustment of the enlarger, the base sheet is normally secured to the bed of the enlarger by applying sticky tape, such as pressure-sensitive or adhesive tape, generally followed by positioning of the desired template and possibly further adjustment of the enlarger relative to the framed opening. Preliminary alignment of the template sheet on the base sheet is facilitated by feel even though the darkroom is lighted at this stage of the procedure.

Following this preliminary alignment, the light is then turned off in the darkroom and a sheet of photographic paper is placed on the base sheet and the template is placed on the paper. This is followed by precise alignment of the template, the photographic paper, and the base sheet by feel along the outside periphery of the so-placed component sheets.

A top cover sheet is usually supplied as a separate piece of the device to prevent exposure of the photographic paper should the darkroom be lighted following positioning of the paper.

Produced as a kit, several different cropping templates may be provided having respective interior openings to match standard sizes of photographs. Thus, a kit will include a base sheet and at least one template sheet, but preferably a plurality of individual template sheets having the same outside peripheral shape and size, but different interior openings, such as 8"×10", 11"×14", or 16"×20", so the particular template sheet conforming to the desired size of the photographic print to be made can be selected for use at any given time.

THE DRAWINGS

The best mode presently contemplated for carrying out the invention in actual practice is illustrated in the accompanying drawings in which:

FIG. 1 is an exploded view in perspective of preferred components of a cropping device provided with only a single template;

FIG. 2, a pictorial view looking downwardly on the cropping device of FIG. 1 as assembled and mounted in a conventional photographic enlarger for use, the enlarger being shown only fragmentally and largely schematically and the sheet of photographic paper being partially broken out to reveal otherwise covered structures; and FIG. 3, a view in transverse vertical section through a kit as a packaged product containing several sizes of templates.

DETAILED DESCRIPTION OF THE ILLUSTRATED EMBODIMENTS

As previously indicated, the present invention provides an easy way to produce cropped photographs. It is relatively inexpensive, so that it can be used by amateur photographers and photography students. However, it provides professional results, and can be used by professional photographers more easily than can the currently available cropping devices.

Figure 1:
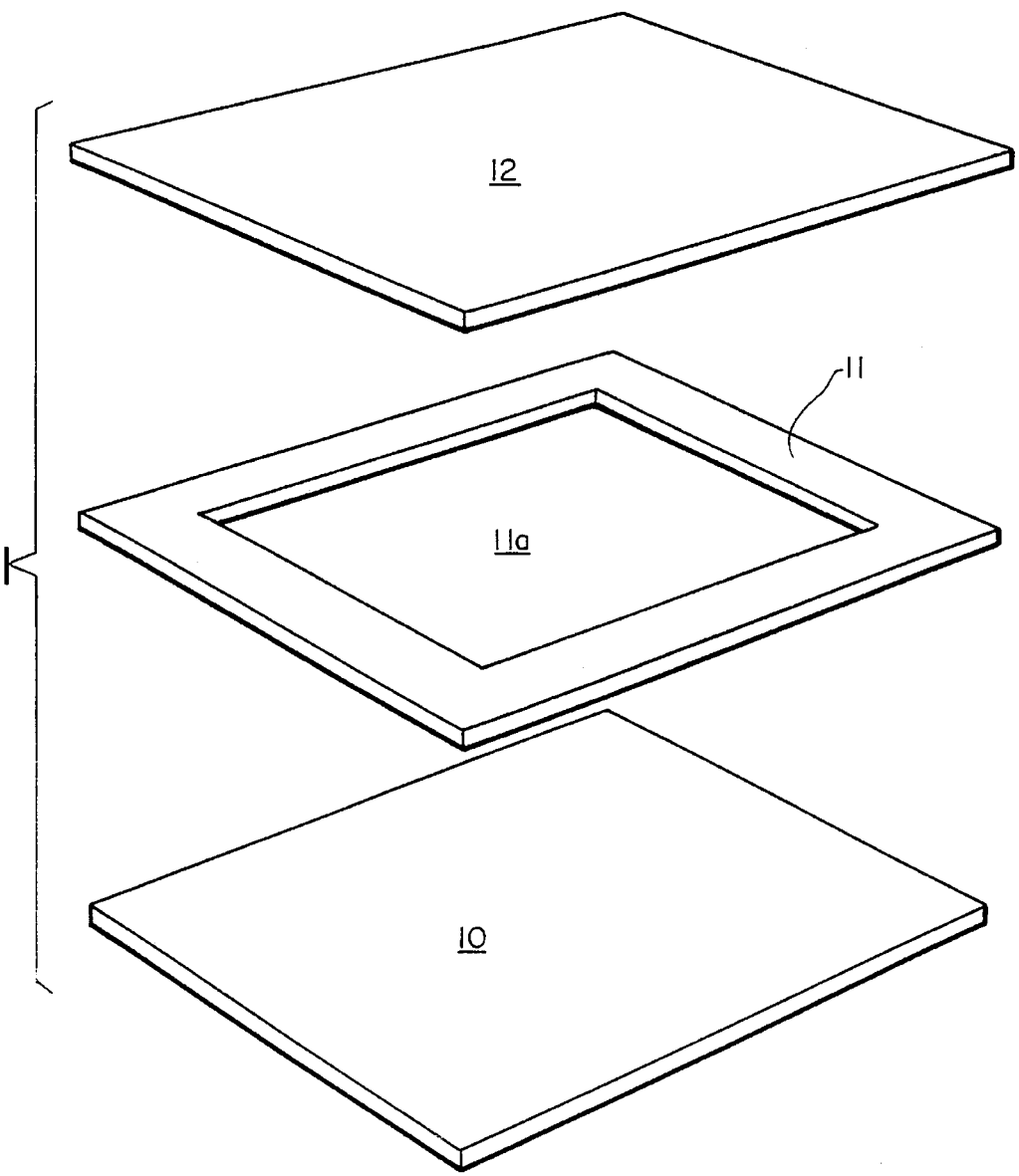

In FIG. 1, the device is shown as comprising a base sheet 10 of rigid and preferably white plastic, a single template sheet 11 of opaque plastic framing an interior opening 11*a*, and a top cover sheet 12, which is preferably made of the same opaque plastic as the template sheet but extending solidly without an interior opening.

Figure 3:
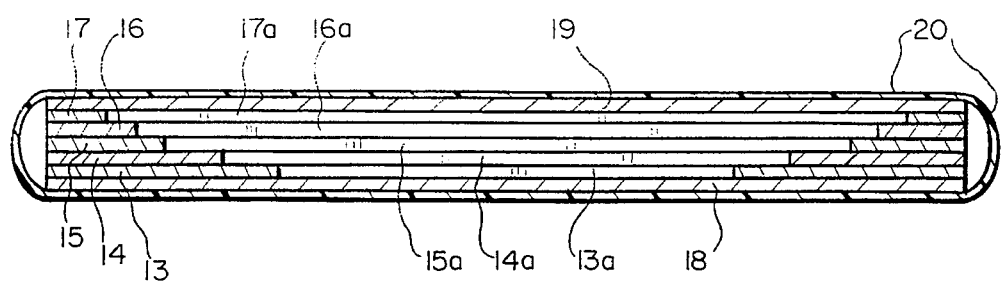

As shown in FIG. 3, a plurality of template sheets, for example as indicated 13 through 17, may be provided along with a base sheet 18 and cover sheet 19 as an all-purpose kit packaged in a bag 20 or other container or wrapping, the individual template sheets having the same outside peripheral shape and size but with differently sized interior openings 13a, 14a, 15a, 16a, and 17a, respectively, for the purpose of accommodating and framing photographic images with differently sized, shaped, and located marginal borders as desired on the resulting photographic prints. Such interior openings may be square, rectangular, circular, oval, etc., located centrally or otherwise within the outside peripheries of the base sheet and of the template sheets. The outside peripheries usually will be a standard photographic paper size such as 8"×10", 11"×14", or 16"×20".

Figure 2:
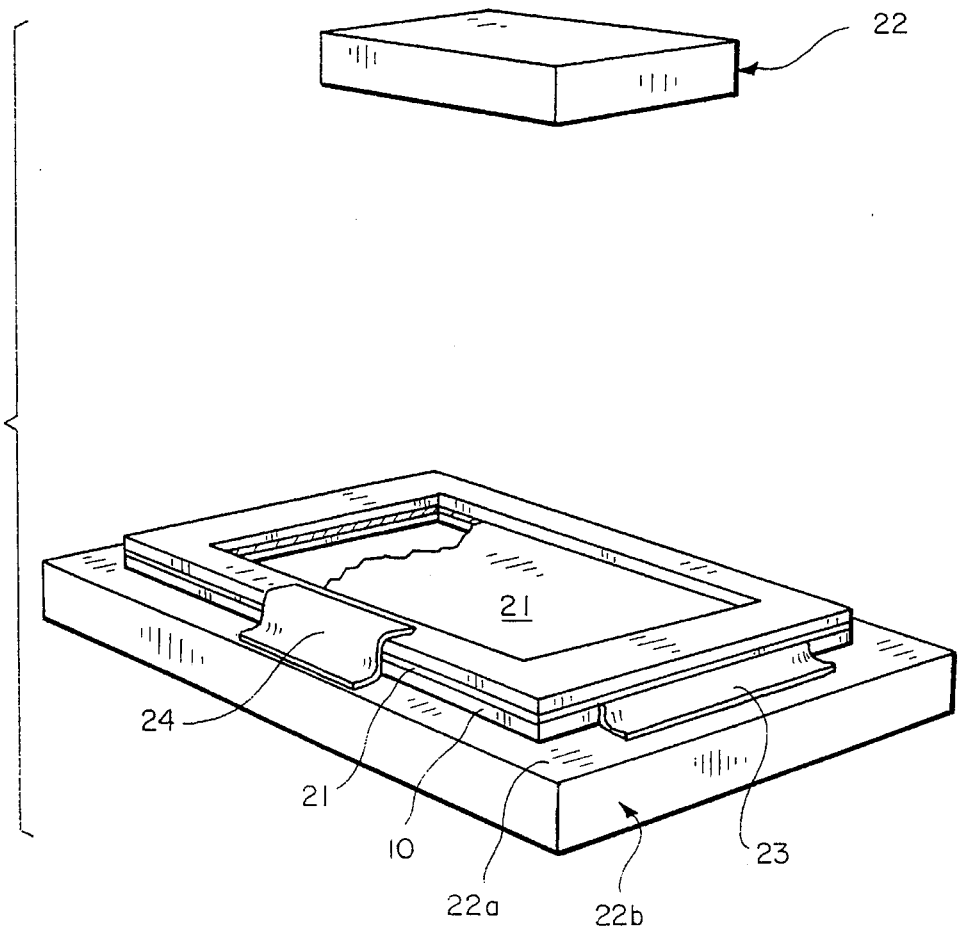

The face of the base sheet 10, FIGS. 1 and 2, or 18, FIG. 3, over which a sheet of photographic paper 21, FIG. 2, is ultimately placed is preferably white to facilitate viewing an image projected by a conventional photographic enlarger 22 onto the base sheet 10 or 18 during adjustment of such enlarger prior to placement of the photographic paper. That is the reason for making the base sheet of white plastic.

The template sheet 11, or template sheets 13 through 17, and top cover sheet 12, FIG. 1, or 19, FIG. 3, are made of opaque material that will not pass light, preferably black plastic sheet material. With cover sheet 12 or 19 in place, light from the enlarger or from the darkroom if inadvertently lighted is kept from exposing the sheet of photographic paper 21. The template sheet prevents exposure of marginal areas of the photographic paper during exposure for a print.

The making of the several sheet components of the device of a plastic that is resistant to photographic developer chemicals, for example polyvinylchloride, is desirable, but they can be made of other materials having thickness and stiffness sufficient to permit alignment by feel.

For some special effects photography, it may be desirable to paint liquid developer onto the exposed photographic paper, rather than to dip the paper into a tray of such liquid. Since the template sheet shows where the exposed image is located, it is advantageous to leave it in place during the process of painting the developer onto the paper. Accordingly, the template sheet and preferably also the base sheet are desirably resistant to photographic developer chemicals. With a suitable plastic, the chemicals can be easily rinsed off. If developer is painted onto the exposed photographic paper and is left for the required period of time, the paper is then put into a stop bath to stop development followed by a fixer bath to fix the developed image. Normally, however, the light-exposed sheets of photographic paper will be developed in the usual way by removal from the cropping device and immersion in a bath of developer. This is followed by a stop bath and fixer bath.

As previously indicated, the base sheet 10 and the template sheets are provided for the standard sizes of photographic paper, i.e., 8"×10", 11"×14", and 16"×20", but other sizes may also be provided for. A packaged kit will generally be provided for a single size of photographic paper and may contain a single template or templates with a variety of sizes, shapes, and arrangements of interior openings.

In use, as shown in FIG. 2, base sheet 10 is positioned on an entirely flat receiving surface 22a of a support 22, such as the stand 22b of the enlarger 22. A template sheet of desired interior opening size, shape, and arrangement is conformingly placed on and aligned with the base sheet 10. Enlarger 22 is then adjusted and base sheet 10 is positioned so that an image or portion thereof of desired size is projected onto the white face of such base sheet. Base sheet 10 is removably secured in desired position to the surface 22a as by means of sticky tape 23. Once the base sheet is secured in desired position, with the enlarger adjusted as desired, the room is darkened and a sheet of photographic paper 21 is placed on the base sheet, developer side up. The desired template sheet is placed on the photographic paper, and the three sheets are aligned by feel on their outside edge. This is easily done, since the sheet of photographic paper, the base sheet, and the selected template sheet are the same peripheral shape and size and the base sheet and template sheet are sufficiently thick and stiff to enable alignment by feel.

A thickness of approximately one-eighth of an inch is preferred for both the base sheet and the template sheet.

When the enlarger is operated to project the image onto the photographic paper, the template sheet will protect the marginal edges of the photographic paper from being exposed. After exposure, the photographic paper is usually developed in the normal manner by dipping in a bath of developer solution. The photographic image as developed will appear within the area that was under the interior opening of the template sheet, while the surrounding marginal edges that were covered by the template sheet will turn out to be white as the desired border, since they were unexposed.

For multiple prints of the same image, the template sheet can be hinged along one of its sides by applying a piece of preferably adhesive tape 24, FIG. 2, as a hinge. This will ensure the same positioning each time the template sheet is placed over a new sheet of photographic paper in the making of multiple prints.

If, during this process, when the photographic paper has been placed on the base sheet and the template placed on the paper, but before the paper has been removed and developed, it is desired for some reason to turn on the lights in the darkroom, cover sheet 12, FIG. 1, may be placed on the template to prevent light from falling onto the photographic paper. Thus, cover while sheet 12 is advantageously provided with the kit, it is not a necessary part of the kit and its use is not required in the method of the invention.

The present device provides a very economical and easy way to produce cropped photographs. As stated, it can be used by amateur photographers and photography students. Yet, since it provides professional results, it can be used by professional photographers more easily than can the currently available cropping devices. Provided in kit form, with multiple templates having different sizes of interior openings, a user is able to select the desired template sheet and can quickly assemble the component parts in a darkroom.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A device made up of separate pieces for use with a photographic enlarger for cropping photographic prints during printing of an image on photographic paper, comprising a base sheet upon which can be disposed a sheet of photographic paper having substantially the same shape and outside peripheral edge dimensions as said base sheet and having a developing face that will be uppermost when the reverse side of said sheet of photographic paper is placed against said base sheet; and a template sheet adapted to be placed upon said developing face of said sheet of photographic paper as placed on said base sheet, said base sheet and said template sheet having substantially the same shape and outside peripheral edge dimensions and having thickness and stiffness sufficient to enable proper alignment entirely by feel of the outside peripheral edges thereof in an unlighted darkroom with respect to the assembled base sheet, template sheet as conformingly placed on said base sheet, and said sheet of photographic paper as applied to said base sheet and said template sheet, said template sheet having an interior opening for passing an image projected from a photographic enlarger onto said sheet of photographic paper in an exposure area between said base sheet and the exterior edge of said template sheet while said template sheet protects peripheral margins of said photographic paper from exposure to light projected from said enlarger.

2. A device according to claim 1, further comprising an opaque cover sheet larger than the interior opening in the template sheet and adapted to be placed over said template sheet to prevent light from passing through said opening therein.

3. A device according to claim 1, wherein the surface of the base sheet upon which the photographic sheet is to be placed is substantially white.

4. A device according to claim 3, wherein the template sheet is substantially black.

5. A device according to claim 1, wherein the base sheet and the template sheet are of material substantially resistant to damage by photographic developer chemicals.

6. A device according to claim 5, wherein the material is a plastic.

7. A device according to claim 1, wherein the base sheet and the template sheet have thicknesses, respectively, of approximately one-eighth of an inch.

8. A device according to claim 1 in packaged kit form, the kit containing a plurality of selectively available template sheets having interior openings, respectively, of different sizes.

9. A device according to claim 8, wherein the base sheet is white plastic and the template sheets are black plastic.

10. The device of claim 1, further comprising separate, removable, attachment means for fastening at least the base sheet to a flat receiving surface of a support while manually maintaining the assembly conformingly together by feel of outside peripheral edges of said assembly.

11. A method of producing cropped photographs by positioning on the stand of a photographic enlarger a cropping device in accordance with claim 1 for making a photographic print having a desired border, said method comprising the steps of applying the base sheet on the stand of the enlarger; adjusting the enlarger for placing the image to be printed within an area corresponding to that of the interior opening of a selected template sheet when aligned with said base sheet; placing a sheet of photographic paper on said base sheet in general alignment therewith and so that its developing face is positioned to receive the image projected by the edge enlarger; placing said template sheet on the so-positioned photographic paper; finally aligning base sheet and template sheet relative to the sheet of photographic paper by feel of the outer peripheries thereof in the dark; and operating said enlarger to project the image to be printed within said interior opening of the template sheet while marginal edge portions of the photographic paper are protected from exposure by said template sheet.

12. The method of claim 11, wherein the base sheet is removably secured to the stand of the enlarger after being positioned thereon and before application of the template sheet.

13. The method of claim 11, wherein the template sheet is secured to the base sheet in its aligned position by hinging thereto with a strip of adhesive tape so additional prints can be made repeatedly by replacement of exposed sheets of photographic paper with fresh sheets, without the need for realignment.

14. A method of producing a photographic print having a desired border, said method comprising the steps of positioning a base sheet on a stand of a photographic enlarger; adjusting the enlarger and positioning the base sheet on the enlarger stand for placing an image to be printed within an area corresponding to that of the interior opening of a selected template sheet when aligned with said base sheet; placing a sheet of photographic paper of the same peripheral size as the base sheet on said base sheet in general alignment therewith and so that its developing face is positioned to receive the image projected by the enlarger; placing on the so-positioned photographic paper a selected template sheet of the same outside peripheral edge size as the base sheet and the photographic paper; finally aligning the assembled base sheet, photographic paper, and template sheet by feel of the outer peripheral edges thereof in the dark; operating said enlarger to project and expose on the photographic paper the image to be printed within said interior opening of the template sheet while marginal edge portions of the photographic paper are protected from exposure by said template sheet; and developing the image on the photographic paper.

15. The method of claim 14, wherein the base sheet is removably secured to the stand of the enlarger after being positioned thereon for placing an image to be printed within an area corresponding to that of the interior opening of a selected template sheet.

16. The method of claim 15, wherein the template sheet is secured to the base sheet in its aligned position by hinging thereto with a strip of adhesive tape so additional prints can be made repeatedly by replacement of exposed sheets of photographic paper with fresh sheets, without the need for realignment.

17. The method of claim 14, wherein the image on the photographic paper is developed by applying developer chemicals to the exposed areas of the photographic paper while it is still assembled between the base sheet and the template sheet.

\* \* \* \* \*